(12) United States Patent
Shew

(10) Patent No.: US 11,113,753 B1
(45) Date of Patent: Sep. 7, 2021

(54) NETWORK ACCESS SYSTEM FOR A SHOPPING APPLICATION AND RELATED METHODS

(71) Applicant: Inmar Brand Solutions, Inc., Winston-Salem, NC (US)

(72) Inventor: Amber Shew, Winston-Salem, NC (US)

(73) Assignee: INMAR BRAND SOLUTIONS, INC., Winston-Salem, NC (US)

( * ) Notice: Subject to any disclaimer, the term of this patent is extended or adjusted under 35 U.S.C. 154(b) by 63 days.

(21) Appl. No.: 16/700,526

(22) Filed: Dec. 2, 2019

(51) Int. Cl.
| | |
|---|---|
| *G06Q 30/06* | (2012.01) |
| *G06Q 20/32* | (2012.01) |
| *H04W 4/20* | (2018.01) |
| *H04W 4/021* | (2018.01) |
| *G06Q 30/02* | (2012.01) |

(52) U.S. Cl.
CPC ..... *G06Q 30/0643* (2013.01); *G06Q 20/3224* (2013.01); *G06Q 30/0236* (2013.01); *H04W 4/021* (2013.01); *H04W 4/20* (2013.01)

(58) Field of Classification Search
CPC .......... G06Q 30/0643; G06Q 30/0236; G06Q 20/3224; H04W 4/021; H04W 4/20
See application file for complete search history.

(56) References Cited

U.S. PATENT DOCUMENTS

2017/0076361 A1* 3/2017 Levesque .......... G06Q 30/0639

FOREIGN PATENT DOCUMENTS

WO WO-2013078408 A1 * 5/2013 ............ H04W 12/08

OTHER PUBLICATIONS

"How iOS decides which wireless network to auto-join" Apple Support Nov. 2019 https://web.archive.org/web/20191117203401/https://support.apple.com/en-US/HT202831 (Year: 2019).*
American Airlines; "Wi-Fi and connectivity;" website: https://www.aa.com/i18n/travel-info/experience/entertainment/wi-fi-and-connectivity.jsp; 2019; pp. 1-3.

* cited by examiner

*Primary Examiner* — Alexandru Cirnu
(74) *Attorney, Agent, or Firm* — Allen, Dyer, Doppelt + Gilchrist, P.A.

(57) ABSTRACT

A network access system may include first and second WiFi networks in a physical store. The network access system may also include a mobile wireless communications device associated with a shopper. The mobile wireless communications device may include a controller and a device wireless network interface associated therewith to execute a shopping application associated with the physical store, and enable the shopping application to communicate via the first WiFi network responsive to the mobile wireless communications device being geographically located within the physical store. The controller and device wireless network interface may also enable at least one other application to communicate via the second WiFi network responsive to the mobile wireless communications device being geographically located within the physical store.

15 Claims, 6 Drawing Sheets

NETWORK ACCESS SYSTEM FOR A SHOPPING APPLICATION AND RELATED METHODS

TECHNICAL FIELD

The present invention relates to the field of networking, and more particularly, to wireless network access and related methods.

BACKGROUND

A wireless network is a computer network that uses wireless data connections between network nodes, for example, computing devices. A wireless network may be in the form of a cellular network, a satellite communications network, a terrestrial microwave network, and a wireless local area network. One type of wireless local area network is a WiFi' network. WiFi may be used to access the Internet, for example.

A mobile application or app is a computer program that is executed on a mobile device, such as a mobile telephone or tablet. One type of application is an application associated with a store or retailer. A retailer, for example, may develop and publish an application to enhance a shopper's experience or to complement or either or both of physical store and online shopping.

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

SUMMARY

A network access system may include first and second WiFi networks in a physical store. The network access system may also include a mobile wireless communications device associated with a shopper. The mobile wireless communications device may include a controller and a device wireless network interface associated therewith to execute a shopping application associated with the physical store, and enable the shopping application to communicate via the first WiFi network responsive to the mobile wireless communications device being geographically located within the physical store. The controller and device wireless network interface may also enable at least one other application to communicate via the second WiFi network responsive to the mobile wireless communications device being geographically located within the physical store.

The first WiFi network may be configured to provide faster speed than the second WiFi network. The controller may be configured to enable the at least one other application to communicate via the second WiFi network while the shopping application is enabled to communicate via the first WiFi network, for example.

The network access system may further include a server configured to generate physical store content related to products for purchase at the physical store and communicate the physical store content to the shopping application via the first WiFi network. The mobile wireless communications device may include a display coupled to the controller, and the server may be configured to generate a store layout on the display based upon the shopping application, for example.

The server may be configured to generate a digital promotion for a product for purchase at the physical store and communicate the digital promotion to the shopping application, for example. The mobile wireless communications device may be configured to communicate with the server via the Internet.

The mobile wireless communications device may include a display coupled to the controller. The controller may be configured to change the display when the at least one other application is enabled to communicate via the second WiFi network, for example.

The mobile wireless communications device may include an input device coupled to the controller. The controller may be configured to enable the shopping application to communicate via the first WiFi network without input from the input device, for example.

The mobile wireless communications device may include an input device coupled to the controller. The controller may be configured to enable the at least one other application to communicate via the second WiFi network based upon input from the input device, for example.

A method aspect is directed to a method of accessing a network. The method may include using a controller and a device wireless network interface associated therewith to execute a shopping application associated with a physical store, and enable the shopping application to communicate via a first WiFi network in the physical store and responsive to the mobile wireless communications device being geographically located within the physical store. The method may also include using the controller and device wireless network interface to enable at least one other application to communicate via a second WiFi network in the physical store and responsive to the mobile wireless communications device being geographically located within the physical store.

A computer readable medium aspect is directed to a non-transitory computer readable medium for accessing a network. The non-transitory computer readable medium includes computer executable instructions that when executed by a controller coupled to a device wireless network interface associated therewith, cause the controller to perform operations. The operations include executing a shopping application associated with a physical store and enabling the shopping application to communicate via a first WiFi network in the physical store and responsive to the mobile wireless communications device being geographically located within the physical store. The operations also include enabling at least one other application to communicate via a second WiFi network in the physical store and responsive to the mobile wireless communications device being geographically located within the physical store.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
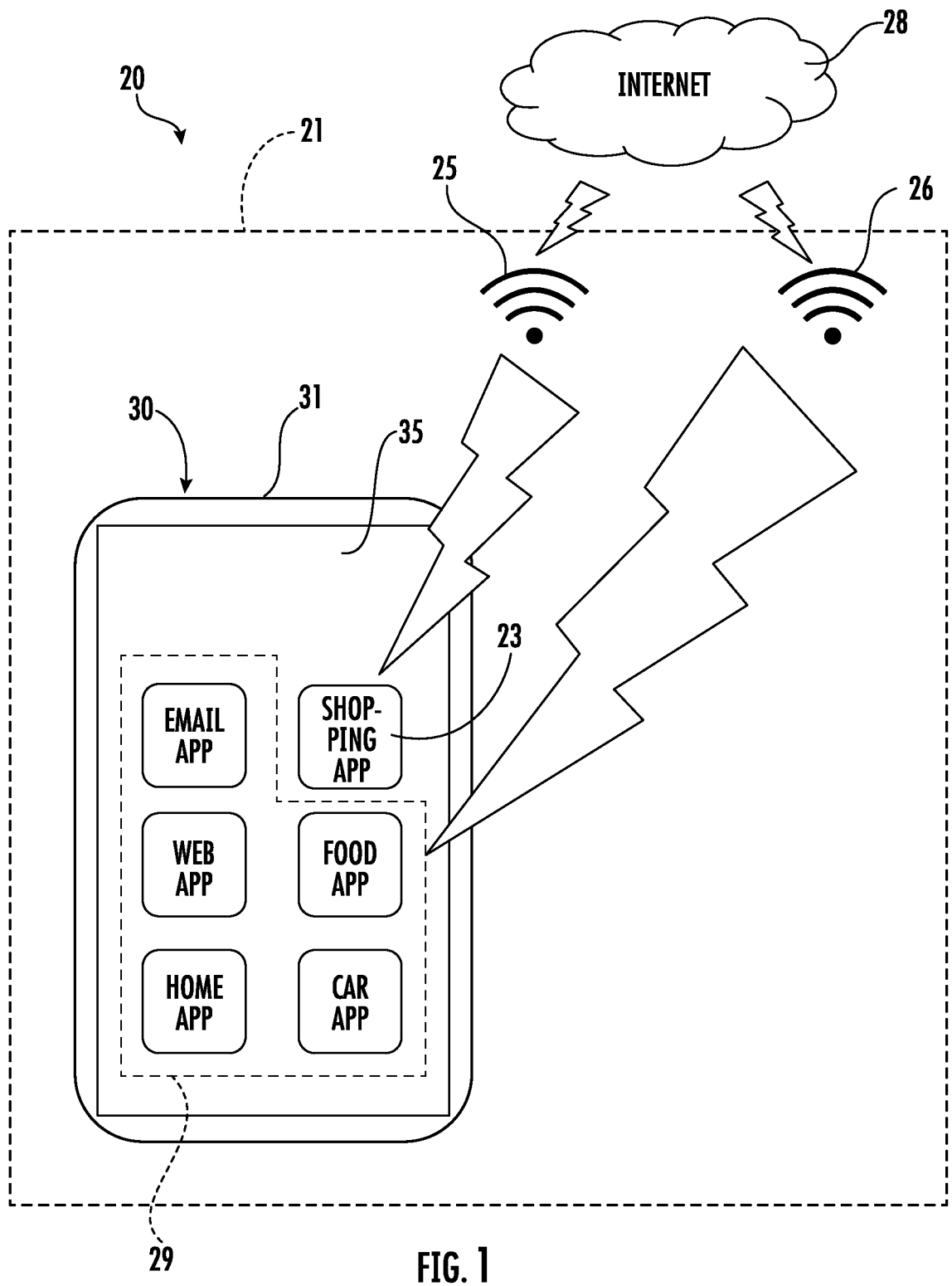
FIG. 1 is a schematic diagram of a network access system in accordance with an embodiment.
Figure 2:
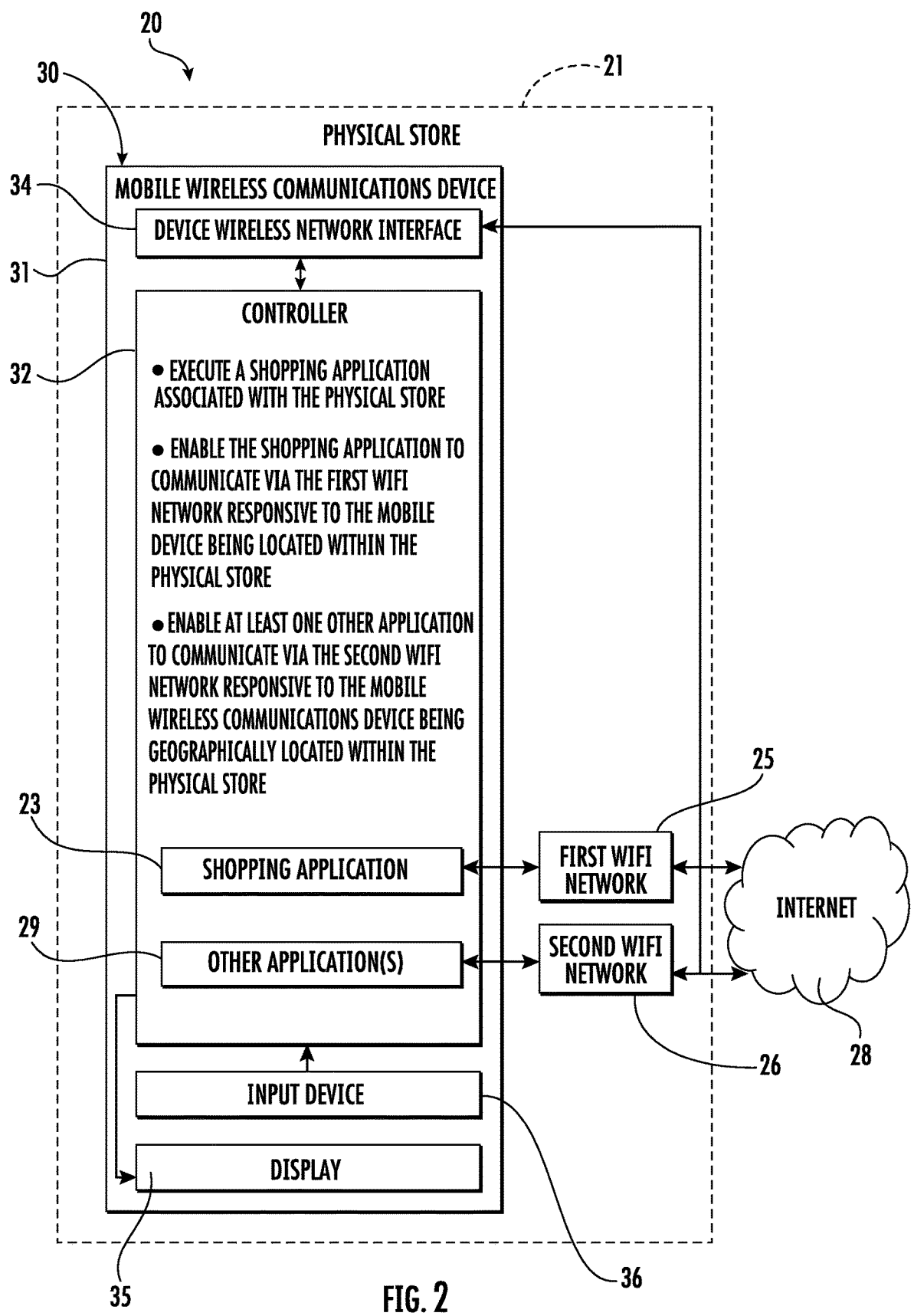
FIG. 2 is a schematic block diagram of the network access system of FIG. 1.

Referring initially to FIGS. 1 and 2, a network access system 20 includes first and second WiFi networks 25, 26 in a physical store 21, for example, a brick-and-mortar retailer. The network access system 20 also includes a mobile wireless communications device 30 associated with a shopper. The mobile wireless communications device 30 illustratively includes a portable housing 31, a controller 32, and a device wireless network interface 34 associated with the controller. The device wireless network interface 34 include wireless communications circuitry, for example, WiFi circuitry, short-range communications circuitry (e.g., Bluetooth), geographic position circuitry, and/or long range communications circuitry (e.g., cellular). Of course, the device wireless network interface 34 may include other and/or additional circuitry.

The mobile wireless communications device 30 also includes a display 35, such as, for example, a touch display, carried by the portable housing 31 and coupled to the controller 32. The mobile wireless communications device 30 may include one or more input devices 36, for example, a touch input component of a touch display, or a pushbutton switch. Of course, the input device 36 may include other and/or additional input devices, for example a camera and other types of input or output devices. The mobile wireless communications device 30 may be a mobile phone or smartphone, a tablet computer, or other type of mobile wireless communications device, as will be appreciated by those skilled in the art.

Figure 3:
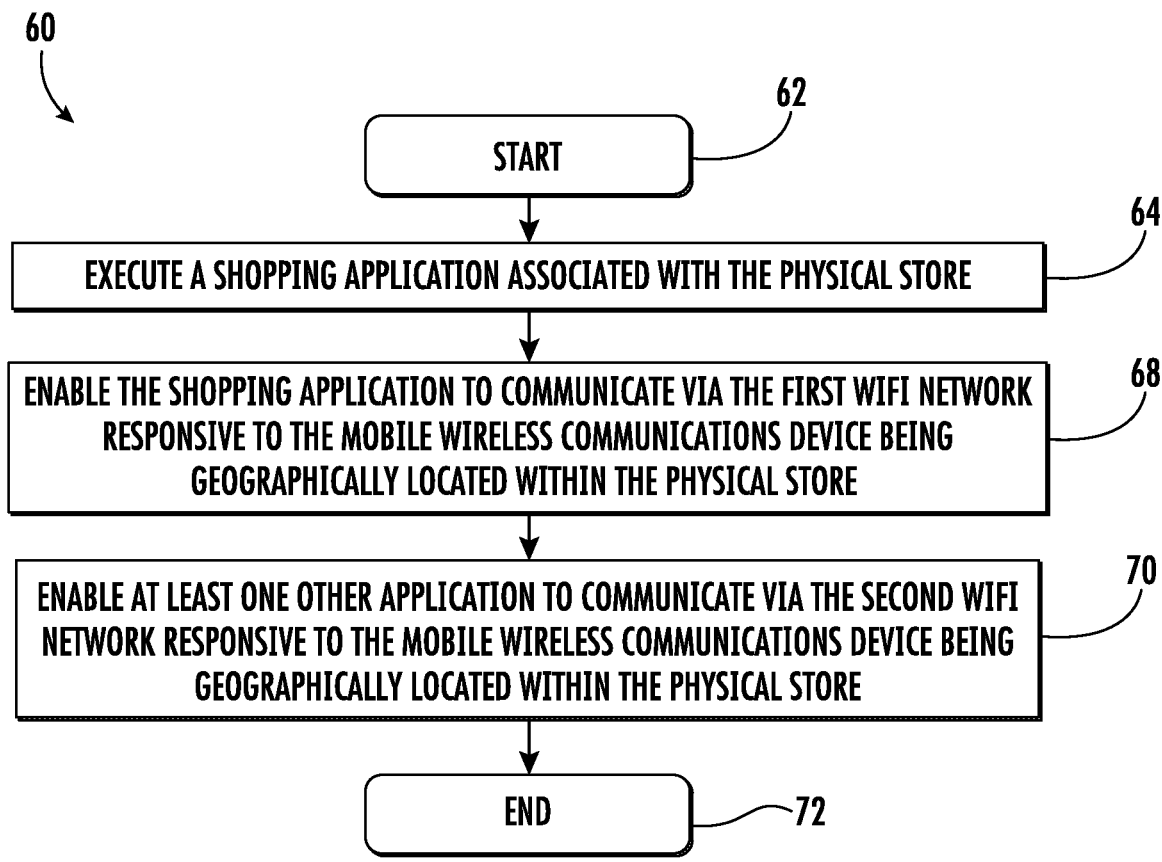
FIG. 3 is a flow diagram illustrating operation of the mobile wireless communications device of the network access system of FIG. 2.

Referring now to the flowchart 60 in FIG. 3, beginning at Block 62, operation of the mobile controller 32 with reference to accessing a network will now be described. The mobile wireless communications device 30, through cooperation with the device wireless network interface 34, executes a shopping application 23 associated with the physical store 21 (Block 64). The shopping application 23 may be a companion mobile application for the retailer, for example, so that a given shopper may shop for and purchase products online from the physical store 21 (e.g., for in-store pickup) and/or online for shipping (e.g., shipping from a warehouse).

The controller 32 cooperates with the device wireless network interface 34 to enable the shopping application 23 to communicate via the first WiFi network 25 responsive to the mobile wireless communications device 30 being located within the physical store 21 (Block 68). In other words, when the mobile wireless communications device 30 is within the physical store 21, the controller 32 enables the shopping application 23 to communicate via the first WiFi network 25 (Block 68). In some embodiments, the controller 32 may connect the first WiFi network 25 so that the shopping application 23 (e.g., only the shopping application) may communicate via the first WiFi network, for example, to the Internet 28. Thus, the first WiFi network 25 may conceptually be considered a private network for communications of the shopping application 23. In some embodiments, the first WiFi network 25 may not be displayed as an available WiFi network for connection thereto, for example, as may be displayed on a listing of available WiFi networks for the mobile wireless communications device 30.

At Block 70, the controller 32 enables one or more other applications 29, for example, not related to the shopping application 23, and such as a web browser, email client, or other application for another retailer, to communicate via the second WiFi network 26 and responsive to the mobile wireless communications device 30 being geographically located within the physical store. Thus, the second WiFi network 26 may conceptually be considered a public WiFi network for the physical store 21. In other words, the second WiFi network 26 may appear on a listing of available for connection WiFi networks within the physical store 21 and for which the mobile wireless communications device 30 may connect, for example, for access to the Internet 28 and/or for other application access to the Internet and either with or without a password or access acceptance.

As will be appreciated by those skilled in the art, the network access system 20 may provide a better or improved in-app experience for shoppers using the shopping application by connecting or enabling communications via the first WiFi network 25 rather than the relative poor coverage and connectivity associated with the "publicly open" second WiFi network 26. In other words, the first WiFi network 25 may provide faster communications speed than the second WiFi network 26, in part because of the limited communications traffic on the first WiFi network since it is typically restricted to the shopping application 23. Operations end at Block 72.

Figure 4:
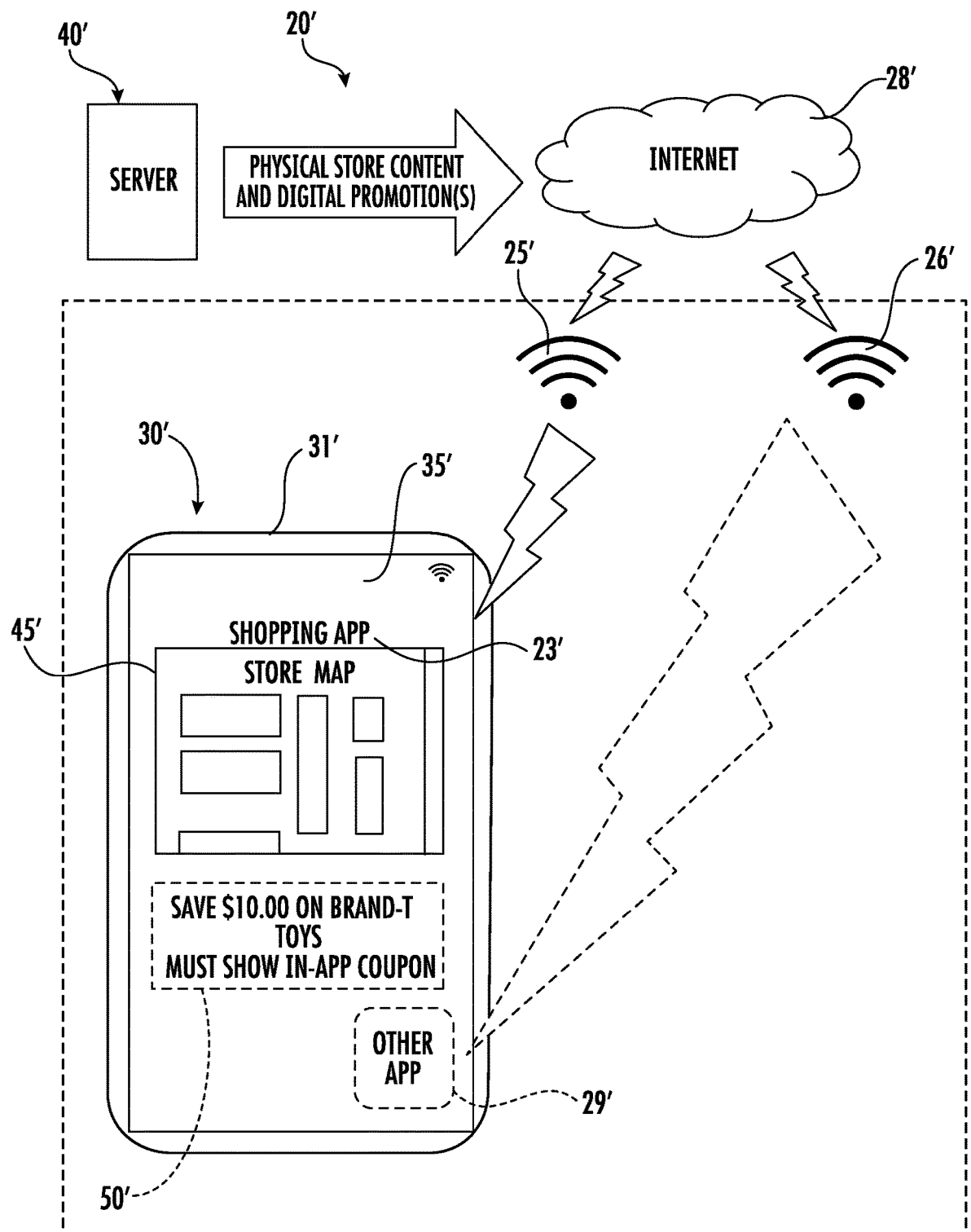
FIG. 4 is a schematic diagram of a network access system in accordance with another embodiment.
Figure 5:
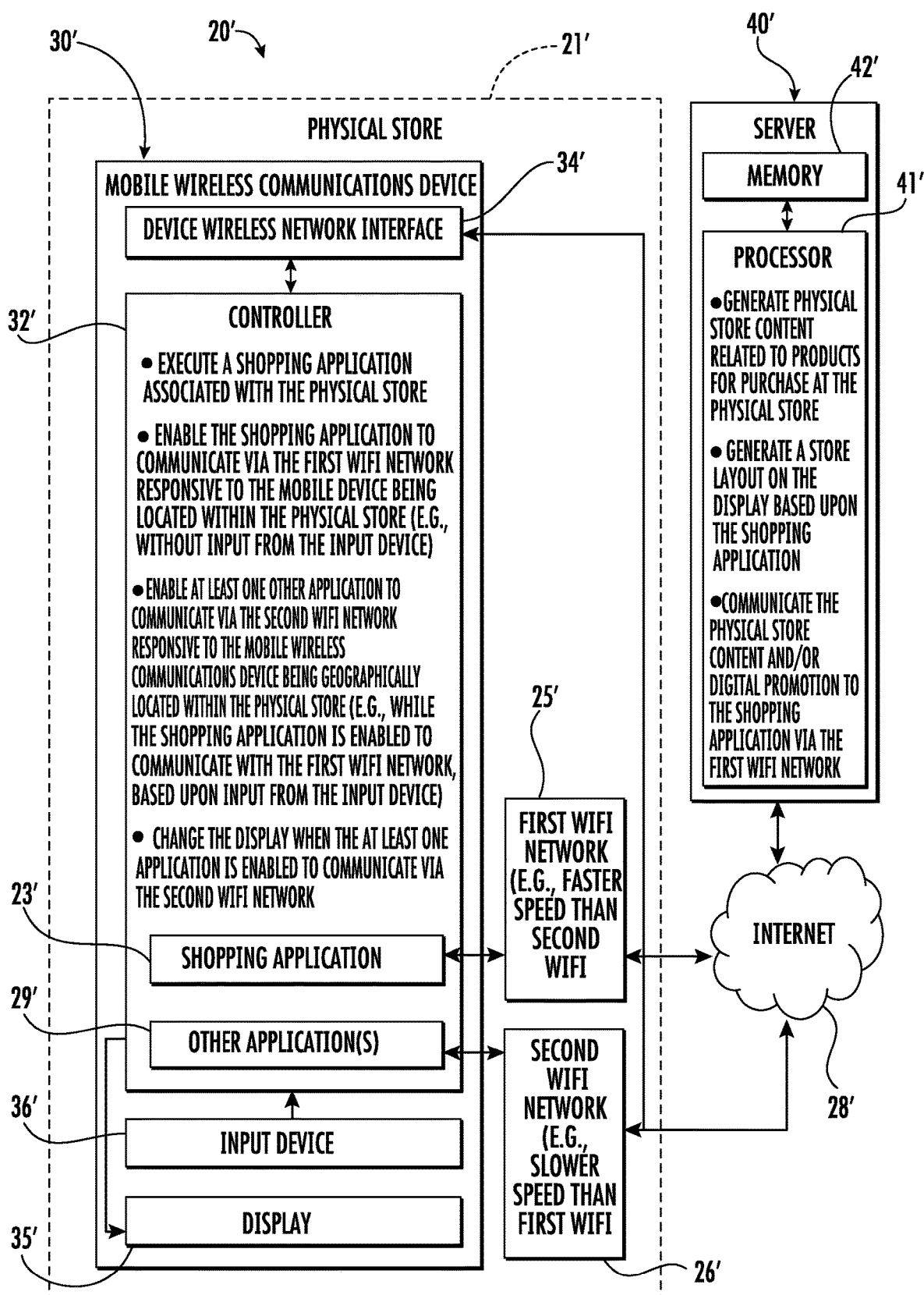
FIG. 5 is a schematic block diagram of the network access system of FIG. 4.
Figure 6:
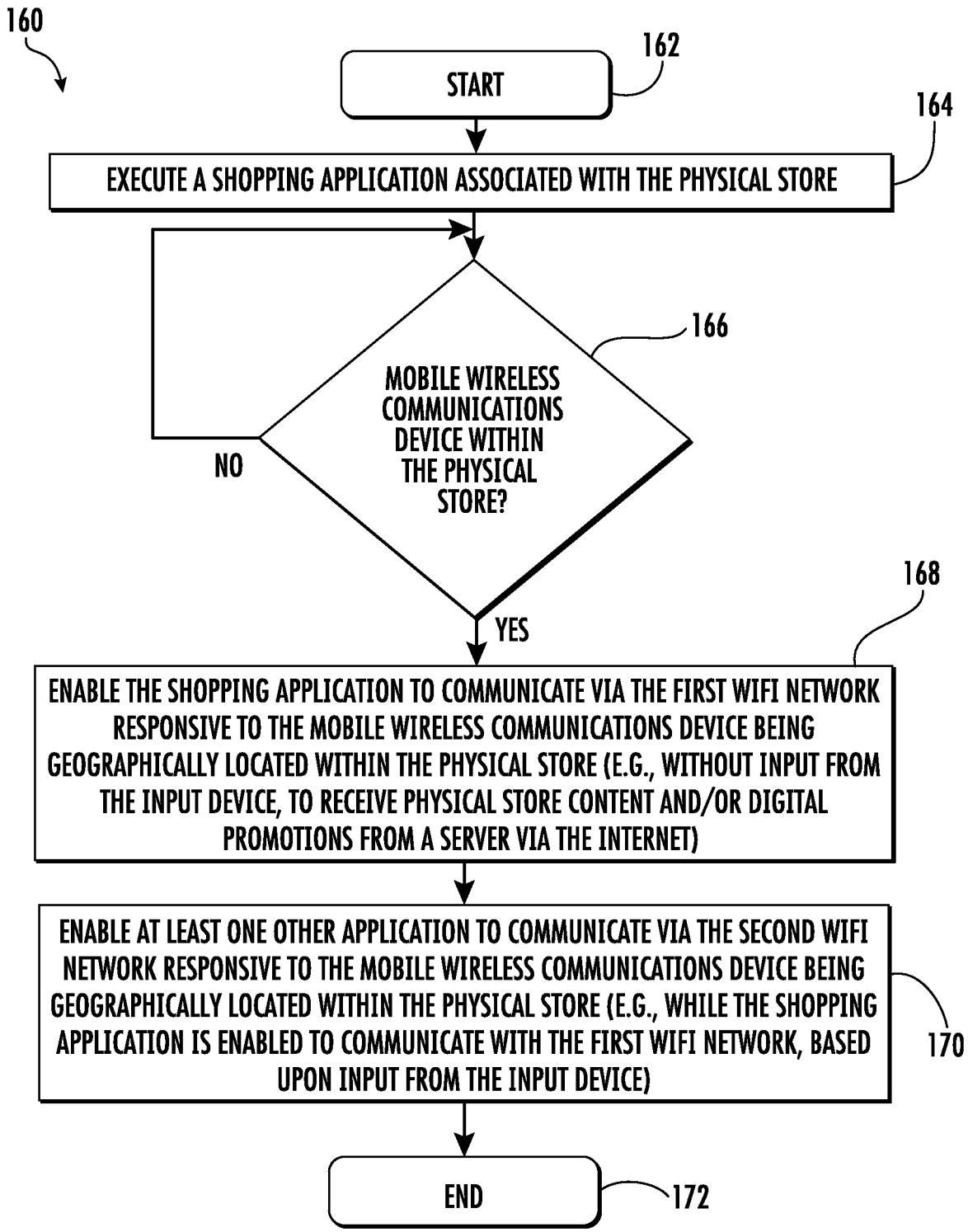
FIG. 6 is a flow diagram illustrating operation of the mobile wireless communications device of the network access system of FIG. 5.

Referring now to FIGS. 4 and 5, and the flowchart 160 in FIG. 6, further details of an embodiment of a network access system 20' will now be described. Beginning at Block 162, the mobile wireless communications device 30', through cooperation with the device wireless network interface 34', executes the shopping application 23' associated with the physical store 21' (Block 164).

The controller 32' cooperates with the device wireless network interface 34' to enable the shopping application 23' to communicate via the first WiFi network 25' responsive to the mobile wireless communications device 30' device being geographically located within the physical store 21'. More particularly, the controller, at Block 166, determines that the mobile wireless communications device 30' is geographically located within the physical store 21'. More particularly, the controller 32', at Block 166, determines that the mobile wireless communications device 30' is geographically located within the physical store 21'. The controller 32' may determine that the mobile wireless communications device 30' is within the physical store based upon a determined geographic position from a beacon, global position system (GPS) receiver, available network identifiers (e.g., WiFi and/or cellular), and/or other geolocation technique, as will be appreciated by those skilled in the art.

If, at Block 166, the mobile wireless communications device is within the physical store 21', the controller 32' enables the shopping application to communicate via the first WiFi network 25' (Block 168) as described above and without input from the input device 36'. That is, in some embodiments, the controller 32' may automatically (i.e., without user input) connect to the first WiFi network 25' so that the shopping application 23' (e.g., only the shopping application) may communicate via the first WiFi network 25', for example, to the Internet 28'. Thus, the first WiFi network 25' may conceptually be considered a private network for communications of the shopping application 23', and connection to the first WiFi network may be transparent to the shopper. If, at Block 166, the mobile wireless communications device 30' is not within the physical store 21', the controller 32' may poll or run idle, for example, as if the shopping application 23' is running as a background application, until it is determined that the mobile wireless communications device 30' is within the physical store 21'.

The network access system 20' also includes a server 40' that includes a processor 41' and an associated memory 42'. The server 40', by way of cooperation between the processor 41' and the memory 42', generates physical store content that is related to products for purchase at the physical store 21'. For example, the server 40' may generate recommended products, on-sale or promotion products, trending products, product details, product photos, product pricing, a store layout 45', and/or product stock quantities. Of course, the physical store content may include other and/or additional types of store content. The physical store content is communicated to the shopping application 23' via the Internet 28' and first WiFi network 25' to the shopping application 23'. In one exemplary embodiment (FIG. 4), the server 40' generates a store layout 45' and communicates the store layout to the shopping application 23'. The controller 32' displays the store layout 45' on the display 35' of the mobile wireless communications device 30' based upon or via the shopping application 23'.

The server 40' may also generate a digital promotion 50' for a corresponding product for purchase at the physical store 21'. The server 40' communicates the digital promotion 50' to the shopping application 23' for display on the display 35'. More than one digital promotion may be generated and communicated for corresponding products for purchase. The digital promotion 50' may be generated by the server 40' based upon the shopper's shopping history (e.g. spending and product purchase), in-store product quantities, or based upon manufacturer or retailer marketing campaigns.

At Block 170, the controller 32' enables one or more other applications 29', for example, not related to the shopping application 23', and such as a web browser, email client, or other application for another retailer, to communicate via the second WiFi network 26' and responsive to the mobile wireless communications device 30' being geographically located within the physical store 21'. Thus, the second WiFi network 26' may conceptually be considered a public WiFi network for the physical store 21'. The other application 29' may be enabled to communicate via the second WiFi network 26' while the shopping application 23' is enabled to communicate via the first WiFi network 25'. In other words, in some embodiments, the shopping and other applications 23', 29' may be provisioned to or actually communicate via the respective WiFi networks 25', 26' at the same time.

As described above, the second WiFi network 26' may appear on a listing of available for connection WiFi networks within the physical store 21' and for which the mobile wireless communications device 30' may connect, for example, for access to the Internet 28' and/or for other application access to the Internet. The other application 29' may be enabled to communicate via the second WiFi network 26' based upon input from the input device 36'. For example, the other application 29' may be enabled to communicate with the second WiFi network 26' based upon selection on a list of available WiFi networks. Upon connection to the second WiFi network 26', the controller 32' may change the display 35', for example, with a WiFi connected icon or other indicator that indicates the device and thus other application 29' is coupled to the second WiFi network 26'. This may be in contrast to the shopping application 23', which upon connection to the first WiFi network 25' may not change the display (i.e., the shopper may be unaware that the shopping application has been enabled to connect or connected to the second WiFi network 26'). Operations end at Block 172.

A method aspect is directed to a method of accessing a network. The method includes using a controller 32 and a device wireless network interface 34 associated therewith to execute a shopping application 23 associated with a physical store 21, and enable the shopping application to communicate via a first WiFi network 25 in the physical store and responsive to the mobile wireless communications device 30 being geographically located within the physical store. The method also includes the controller 32 and device wireless network interface 34 to enable at least one other application 29 to communicate via a second WiFi network 26 in the physical store 21 and responsive to the mobile wireless communications device 30 being geographically located within the physical store.

A computer readable medium aspect is directed to a non-transitory computer readable medium for accessing a network. The non-transitory computer readable medium includes computer executable instructions that when executed by a controller 32 coupled to a device wireless network interface 34 associated therewith, cause the controller to perform operations. The operations may include executing a shopping application 23 associated with a physical store 21 and enabling the shopping application to communicate via a first WiFi network 25 in the physical store and responsive to the mobile wireless communications device 30 being geographically located within the physical store. The operations may also include enabling at least one other application 29 to communicate via a second WiFi network 26 in the physical store 21 and responsive to the mobile wireless communications device 30 being geographically located within the physical store.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A network access system comprising:
   a first WiFi network in a physical store defining a private network for wireless communications of a shopping application associated with the physical store,
   a second WiFi network in the physical store defining a public network for wireless communications of at least one other application, the second WiFi network configured to provide slower speed than the first WiFi network; and
   a mobile wireless communications device associated with a shopper and comprising
      an input device,
      a device wireless network interface, and
      a controller coupled to the input device and associated with the device wireless network interface, the controller configured to
         execute the shopping application associated with the physical store,
         determine that the mobile wireless communications device is within the physical store based upon network identifiers associated with a plurality of available wireless networks available within the physical store,
         enable the shopping application to communicate via the first WiFi network responsive to the mobile wireless communications device being geographically located within the physical store and without input to the input device, and
         enable the at least one other application to communicate via the second WiFi network while the shopping application is enabled to communicate via the first WiFi network and responsive to the mobile wireless communications device being geographically located within the physical store and selection of the second WiFi network from among the plurality of available WiFi networks via the input device.

2. The network access system of claim 1 further comprising a server configured to generate physical store content related to products for purchase at the physical store and communicate the physical store content to the shopping application via the first WiFi network.

3. The network access system of claim 2 wherein the mobile wireless communications device comprises a display coupled to the controller; and wherein the server is configured to generate a store layout on the display based upon the shopping application.

4. The network access system of claim 2 wherein the server is configured to generate a digital promotion for a product for purchase at the physical store and communicate the digital promotion to the shopping application.

5. The network access system of claim 2 wherein the mobile wireless communications device is configured to communicate with the server via the Internet.

6. The network access system of claim 1 wherein the mobile wireless communications device comprises a display coupled to the controller; and wherein the controller is configured to change the display when the at least one other application is enabled to communicate via the second WiFi network.

7. A mobile wireless communications device associated with a shopper and comprising:
   an input device;
   a device wireless network interface; and
   a controller coupled to the input device and associated with the device wireless network interface, the controller configured to
      execute a shopping application associated with a physical store,
      determine that the mobile wireless communications device is within the physical store based upon network identifiers associated with a plurality of available wireless networks available within the physical store,
      enable the shopping application to communicate via a first WiFi network in the physical store and responsive to the mobile wireless communications device being geographically located within the physical store and without input to the input device, the first WiFi network defining a private network for wireless communications of the shopping application associated with the physical store, and
      enable at least one other application to communicate via a second WiFi network in the physical store while the shopping application is enabled to communicate via the first WiFi network and responsive to the mobile wireless communications device being geographically located within the physical store and selection of the second WiFi network from among the plurality of available WiFi networks via the input device, the second WiFi network defining a public network for wireless communications of the at least one other application, and the second WiFi network configured to provide slower speed than the first WiFi network.

8. The mobile wireless communications device of claim 7 wherein the controller is configured to obtain, from a server, physical store content related to products for purchase at the physical store, the physical store content being communicated from the server to the shopping application via the first WiFi network.

9. The mobile wireless communications device of claim 8 wherein the controller is configured to obtain, from the server, a digital promotion for a product for purchase at the physical store, the digital promotion being communicated to the shopping application.

10. A method of accessing a network comprising:
    using a mobile wireless communications device comprising a controller and a device wireless network interface associated therewith to
       execute a shopping application associated with a physical store,
       determine that the mobile wireless communications device is within the physical store based upon network identifiers associated with a plurality of available wireless networks available within the physical store,
       enable the shopping application to communicate via a first WiFi network in the physical store and responsive to the mobile wireless communications device being geographically located within the physical store and without input to an input device coupled to the controller, the first WiFi network defining a private network for wireless communications of the shopping application associated with the physical store, and enable at least one other application to communicate via a second WiFi network in the physical store while the shopping application is enabled to communicate via the first WiFi network and responsive to the mobile wireless communications device being geographically located within the physical store and selection of the second WiFi network from among the plurality of available WiFi networks via the input device, the second WiFi network defining a public network for wireless communications of the at least one other application, and the second WiFi network configured to provide slower speed than the first WiFi network.

11. The method of claim 10 wherein using the controller comprises using the controller to obtain, from a server, physical store content related to products for purchase at the physical store, the physical store content being communicated from the server to the shopping application via the first WiFi network.

12. The method of claim 11 wherein using the controller comprises using the controller to obtain, from the server, a digital promotion for a product for purchase at the physical store, the digital promotion being communicated to the shopping application.

13. A non-transitory computer readable medium for accessing a network, the non-transitory computer readable medium comprising computer executable instructions that when executed by a controller associated with a device wireless network interface of a mobile wireless communications device, cause the controller to perform operations comprising:

executing a shopping application associated with a physical store;

determining that the mobile wireless communications device is within the physical store based upon network identifiers associated with a plurality of available wireless networks available within the physical store;

enabling the shopping application to communicate via a first WiFi network in the physical store and responsive to the mobile wireless communications device being geographically located within the physical store and without input to the input device, the first WiFi network defining a private network for wireless communications of the shopping application associated with the physical store; and enabling at least one other application to communicate via a second WiFi network in the physical store while the shopping application is enabled to communicate via the first WiFi network and responsive to the mobile wireless communications device being geographically located within the physical store and selection of the second WiFi network from among the plurality of available WiFi networks via the input device, the second WiFi network defining a public network for wireless communications of the at least one other application, and the second WiFi network configured to provide slower speed than the first WiFi network.

14. The non-transitory computer readable medium of claim 13 wherein the operations comprise obtaining, from a server, physical store content related to products for purchase at the physical store, the physical store content being communicated from the server to the shopping application via the first WiFi network.

15. The non-transitory computer readable medium of claim 14 wherein the operations comprise obtaining, from the server, a digital promotion for a product for purchase at the physical store, the digital promotion being communicated to the shopping application.

* * * * *